United States Patent Office 2,728,587
Patented Dec. 27, 1955

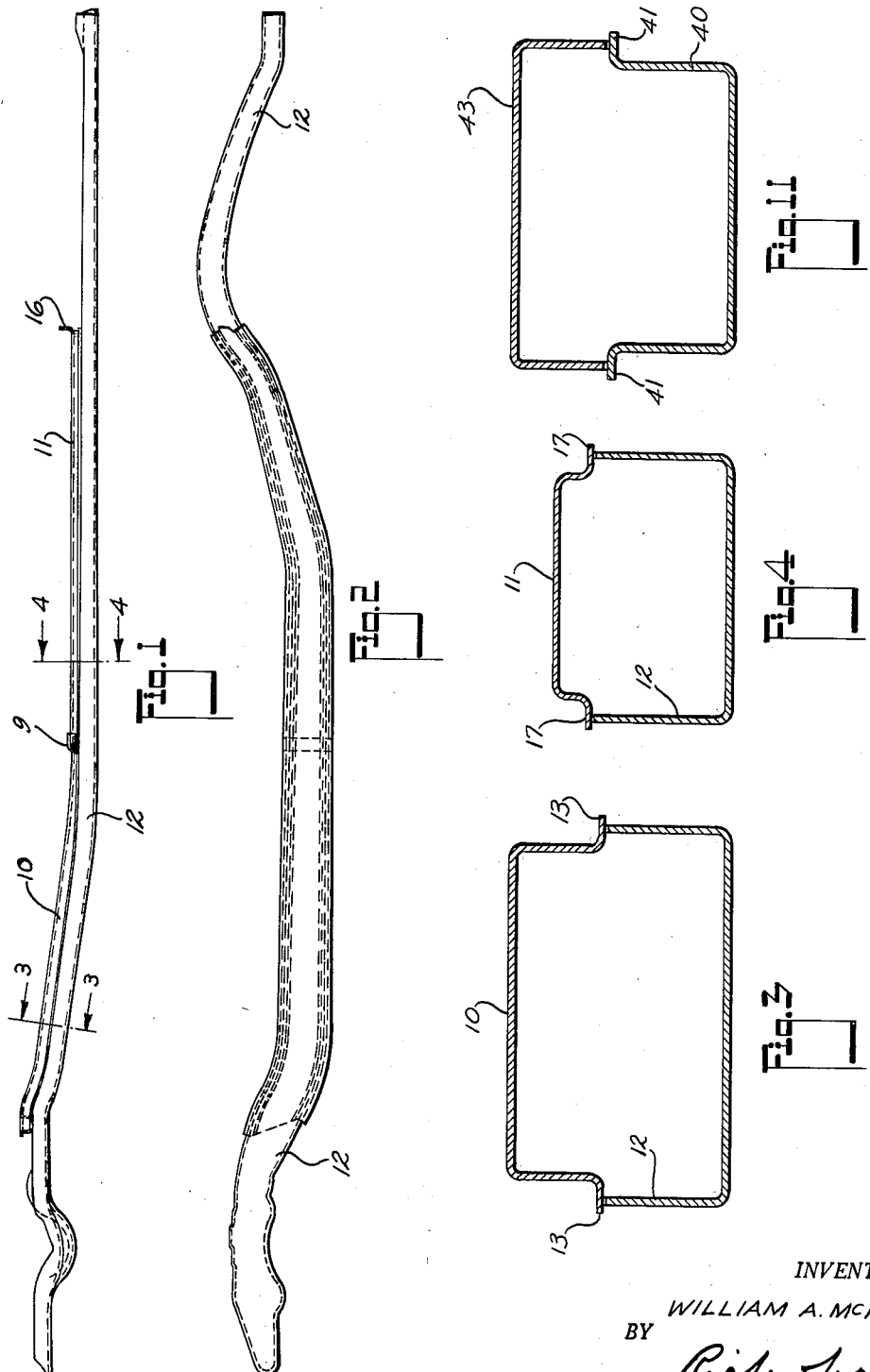

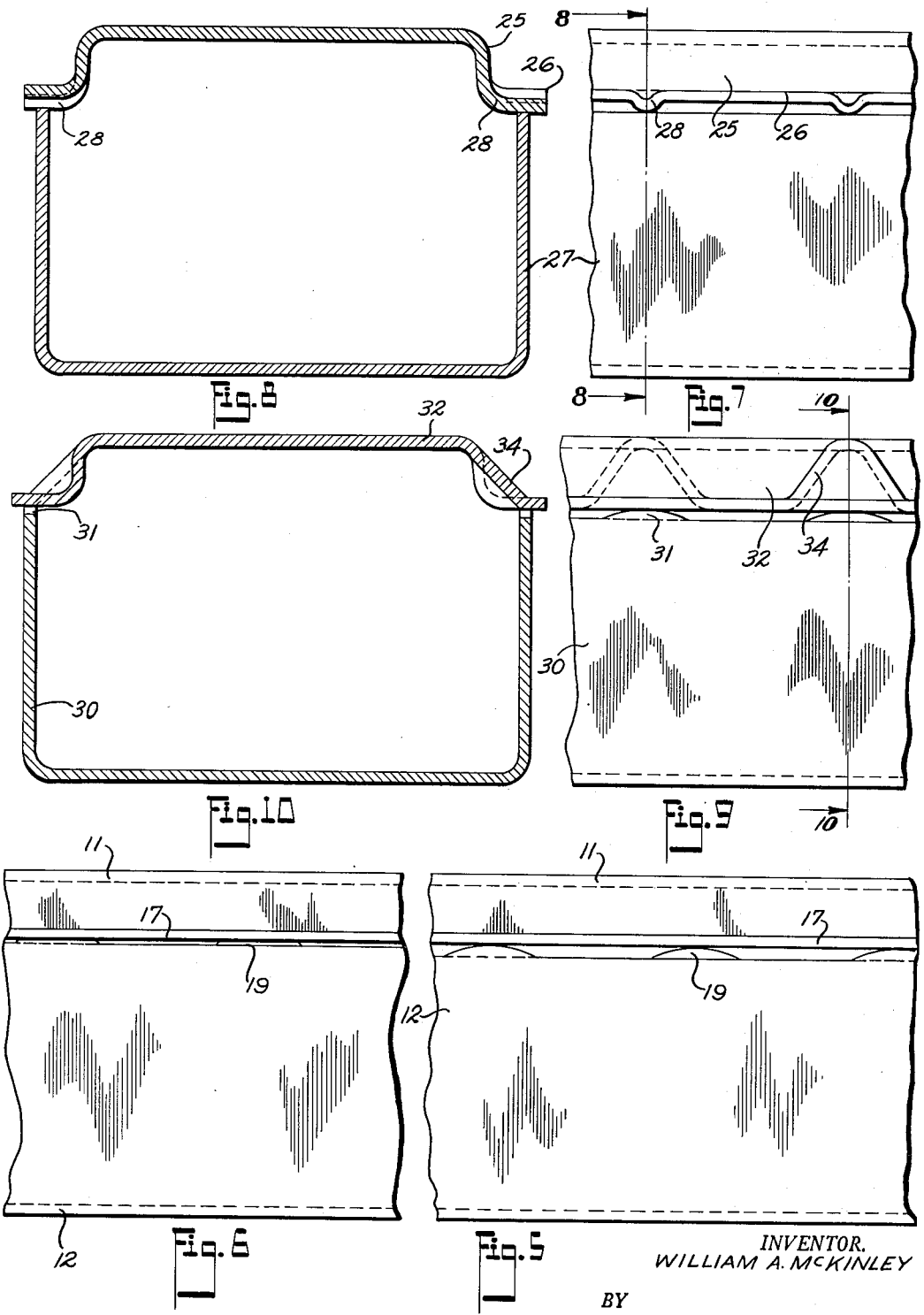

2,728,587

AUTOMOBILE FRAME BOX-SECTION SIDE RAIL

William A. McKinley, Detroit, Mich., assignor to The Midland Steel Products Company, Cleveland, Ohio, a corporation of Ohio Application February 14, 1950, Serial No. 144,097

10 Claims. (Cl. 280—106)

The present invention relates generally to the art of fabricating metal shapes and parts and is more specifically concerned with a novel box section side rail for automobile frames.

Ever since box-section side rails came into general use in the manufacture of automobile frames, serious efforts have been made by others to improve substantially the economics of their commercial production and to increase their strength-weight ratio. These efforts, however, have not met with much success and to the best of my knowledge, the problem of thus improving these side rails has never hitherto been solved.

By virtue of the present invention, these box section rails can be made substantially stronger without increasing their weight and, alternatively, they can be made substantially lighter without decreasing their strength. Furthermore, these rails are not stiffer than the conventional arc-welded box section rails of equivalent section but are able to carry substantially higher stresses than would be permitted in an arc-welded section of substantially the same dimensions. Still further, in accordance with this invention box-section rails of substantially wider section can be produced without increasing the over-all width of the rails. Additionally, these present rails can be manufactured automatically so that a high degree of weld dimension uniformity can be easily obtained while labor costs are maintained at a minimum.

Broadly stated, a side rail of this invention comprises a channel-shaped inner rail with a pair of opposed, integrally-formed flanges extending from the sides of this rail, and an outer channel-shaped rail having a wider web than the inner rail and having substantially parallel sides of approximately the same shape and dimension, the inner and outer rails being disposed in face-to-face relation with the edges of the outer rail abutting and welded to the flanges of the inner rail. Alternatively, the outer rail may be provided with the said opposed flanges, while the inner rail may be flangeless and of increased web width to produce substantially the same results and structure as set forth above.

Those skilled in the art will gain a better understanding of this invention, and the present novel method and rail from the following detailed description, reference being had to the drawings accompanying and forming a part of the specification, in which:

Fig. 1 is a top plan view of an automobile frame side rail embodying this invention in a preferred form;

Fig. 2 is a side elevational view of the side rail assembly of Fig. 1;

Fig. 3 is a transverse sectional view of the rail of Fig. 1 taken on line 3—3 thereof;

Fig. 4 is another transverse sectional view taken on line 4—4 of Fig. 1;

Fig. 5 is a fragmentary plan view of a section of inner and outer rail elements assembled together for welding in accordance with this invention;

Fig. 6 is a fragmentary plan view corresponding to Fig. 5 but showing the inner and outer rails welded together;

Fig. 7 is a fragmentary plan view of an automobile frame side rail embodying this invention in another form;

Fig. 8 is a transverse sectional view taken on line 8—8 of Fig. 7;

Fig. 9 is a fragmentary plan view of an automobile frame side rail embodying this invention in still another form;

Fig. 10 is a transverse sectional view taken on line 10—10 of Fig. 9; and,

Fig. 11 is a transverse sectional view of another type of box-section side rail of this invention.

The side rail of Fig. 1 comprises a pair of channel-shaped inner rails 10 and 11 and an outer rail 12 which is also of channel form. Rail 10 is of varying depth, being tapered from one end to the other as indicated in Figs. 3 and 4, and is provided with a pair of outwardly extending flanges 13 which are integrally formed with the rail. The deep end of rail 10 is formed diagonally so that one edge substantially leads the other, as shown in Fig. 2. The shallow end of the rail, however, is square and is offset slightly to define an enlarged space with rail 12 for receipt of one end of rail 11 as at 9. Rail 11 unlike rail 10, is of substantially uniform depth throughout and at its end remote from rail 10, it is shaped to define a short flange 16 which extends at substantially right angles outwardly from the bottom of the rail. The sides of the channel are cut away adjacent to this flanged end of rail 11 so that flange 16 is spaced from the ends of the pair of outwardly extending flanges 17 of the rail corresponding to flanges 13 of rail 10. Thus, throughout substantially the combined length of rails 10 and 11, continuous side flanges of substantially uniform width are provided and these flanges are relatively narrow compared to the web widths of rails 10 and 11. The purpose of these flanges is to facilitate engagement of the inner and outer rail elements in abutting relation, to provide all the latitude necessary to assure proper engagement and alignment of the parts together during welding, and to afford abutments for engagement with the electrodes of a projection welding machine.

Outer rail 12 is substantially longer than the inner rail assembly and is of varying web width and depth. Throughout its mid-section, where it is engaged by the inner rails, rail 12 is of substantially uniform depth but at its forward end it is deeper while at its other end it is shallower than in said mid-section. The web width of rail 12, however, gradually decreases from the forward end so that in its portion engaging inner rail 10, rail 12 is tapered to define in side elevation an automobile frame side rail of generally conventional design.

Over the full length of the portion of rail 12 to which the inner rails are opposed, the edge portions of rail 12 are provided with a plurality of uniformly spaced projections 19 for engagement with flanges 13 and 17 of the inner rails.

With the inner and outer rails assembled together as indicated in Fig. 5, the assembly is processed on an automatic welding machine of suitable conventional type and the said rails are secured together as indicated in Fig. 6 and form a box-section of strong and light construction having substantially uniform welds. In the welding machine the bottom of the outer rail will preferably be engaged by an electrode of substantial area to hold the assembly in place while two other electrodes of the machine are firmly pressed against the under sides of flanges 13 and 17 to accomplish compression effect indicated in Figs. 5 and 6.

The side rail illustrated in Fig. 7 generally resembles that of Fig. 1, being made up of two inner channel shaped rails 25 having flanged portions 26 like flanges 13 and 17, and an outer rail 27 similar to rail 12 of Fig. 1. Only one of the two inner rails is shown in Figs. 7 and 8, but they are both provided with spaced, rib-like, transversely-extending projections 28 in their flanged portions for engagement with the edges of rail 27. Consequently, welding of the inner rail assembly to the outer rail produces a box-section and this is accomplished suitably as described above and a strong and light weight structure having substantially uniform welds results.

In Figs. 9 and 10, outer rail 30 is substantially the same as rail 12, being provided with spaced projections 31 along its edges. The inner rails 32 (only one shown) differ, however, from rails 10 and 11 in having spaced ribbed portions 34 along their sides to increase the strength of the final side rail box-section. Ribs 34 and projections 31 are equally spaced and are brought into register, as shown in Fig. 9, preliminary to welding, and pressure is applied to hold the assembly together with the edges of rail 30 firmly engaged with the flanged portions of the inner rails, the electrodes of the welding machine preferably performing this function.

Where it is desired, flanges may be provided on the outer rail rather than on the inner ones and essentially the same advantageous and novel results of this invention will be obtained. A structure embodying this alternative form of the invention is illustrated in Fig. 11 wherein an outer rail 40 having a pair of outwardly projecting flanges 41 formed integrally with the rail, is engaged with the edge portions of the inner rail assembly 43 and welded thereto. Spaced projections 45 are provided along the edge portions of the inner rail assembly, and the outer rail has a narrower web section than the inner ones so that the overall width of the final side rail assembly is substantially the same as the side rail of Fig. 1.

Having thus described the present invention so that those skilled in the art may be able to understand and practice the same, I state that what I desire to secure by Letters Patent is defined in what is claimed.

What is claimed is:

1. An automobile frame box-section side rail comprising a channel-shaped inner rail, a pair of opposed flanges carried by said inner rail and extending outwardly from the sides thereof, and an outer channel-shaped rail wider than the channel section of the inner rail and having substantially parallel sides of approximately the same shape and dimensions terminating in an edge formed with projections thereon, said inner and outer rails being disposed in face to face relation with the projections of the outer rail abutting and welded to the flanges of the inner rails.

2. An automobile frame box-section side rail comprising an elongated channel-shaped inner rail, a pair of opposed flanges carried by said inner rail and extending outwardly from the sides thereof, and an outer elongated channel-shaped rail wider than the inner rail and having substantially parallel sides of approximately the same shape and dimensions terminating in an edge, said inner and outer rails being disposed in face to face relation with the edges of the outer rail sides abutting and welded to the flanges along an area spaced from the outer edge thereof.

3. An automobile frame box-section side rail comprising a channel-shaped inner rail, said inner rail being of reduced depth at one end, a pair of opposed flanges carried by said inner rail and extending outwardly from the sides thereof, and an outer channel-shaped rail wider than the channel section of the inner rail and having substantially parallel sides of approximately the same shape and dimensions terminating in an edge formed with projections thereon, said inner and outer rails being disposed in face to face relation with the projections of the outer rail abutting and welded to the flanges of the inner rails.

4. An automobile frame box-section side rail comprising a plurality of channel-shaped inner rails, a pair of opposed flanges carried by each said inner rail and extending outwardly from the sides thereof, and an outer channel-shaped rail wider and longer than the channel section of the inner rails and having substantially parallel sides of approximately the same shape and dimensions terminating in an edge formed with projections thereon, said inner rails being disposed in face to face relation with the outer rail and with projections of the outer rail abutting and welded to the flanges of the inner rails.

5. An automobile frame box-section side rail comprising a channel-shaped inner rail, said inner rail being of reduced depth at one end, a second elongated inner rail overlapping the shallow end of the tapered rail, a pair of opposed flanges carried by each said inner rail and extending outwardly from the sides thereof, and an outer channel-shaped rail wider and longer than the channel section of the inner rails and having substantially parallel sides of approximately the same shape and dimensions, said inner rails being disposed in face to face relation with the outer rail and with the edges of the outer rail abutting and welded to the flanges of the inner rails.

6. An automobile frame box-section side rail comprising a channel-shaped inner rail, said inner rail being of gradually increasing width substantially from one end to the other, a pair of opposed flanges carried by said inner rail and extending outwardly from the longitudinally extending edges thereof, and an outer channel-shaped rail wider than the channel section of the inner rail, and of gradually increasing width between two portions and having substantially parallel sides of approximately the same shape and dimensions, said inner and outer rails being disposed in face to face relation with the edges of the outer rail between said portions abutting and welded to the flanges of the inner rails.

7. An automobile frame box-section side rail comprising a plurality of channel-shaped inner rails, and an outer channel-shaped rail wider and larger than the channel section of the inner rails and having substantially parallel sides of approximately the same shape and dimensions terminating in an edge provided with projections thereon, said outer rail having a pair of opposed flanges carried by said outer rail and extending outwardly from the sides, thereof, and said inner rails being disposed in face-to-face relation with the outer rail and the projections of said inner rail abutting and welded to the flanges of the outer rail.

8. An automobile frame box section side rail comprising a channel-shaped inner rail, a pair of opposed flanges carried by said inner rail extending outwardly from the side thereof said flanges being formed with projections thereon, and an outer channel-shaped rail wider than the channel section of the inner rail having substantially parallel sides of approximately the same shape and dimensions terminating in an edge, said inner and outer rails being disposed in a face to face relation with the edges of the outer rail abutting and welded to the projections on the flanges of the inner rail.

9. An automobile frame box section side rail comprising channel-shaped inner rail, a pair of opposed flanges carried by said inner rail extending outwardly from the side thereof, and an outer channel-shaped rail wider than the channel section of the inner rail and having substantially parallel sides of approximately the same shape and dimensions terminating in an edge, projections being formed on one of said rails, said inner and outer rails being disposed in a face to face relation with the edges of the outer rail adjacent to the flanges of the inner rail, the projections on one of said rails engaging the adjacent portion on the other of said rails and being welded thereto.

10. An automobile frame box-section side rail comprising an elongated channel-shaped inner rail, a pair of opposed flanges carried by said inner rail and extending from the sides thereof, and an outer elongated channel-shaped rail of width different from the inner rail and having substantially parallel sides of approximately the same shape and dimensions terminating in an edge, said inner and outer rails being disposed in face to face relation with the edges of the outer rail sides abutting and welded to the flanges along an area spaced from the outer edge thereof.

References Cited in the file of this patent

UNITED STATES PATENTS

| | | |
|---|---|---|
| 928,701 | Rietzel | July 20, 1909 |
| 1,654,107 | Andren | Dec. 27, 1927 |
| 1,911,061 | Clark | May 23, 1933 |
| 1,992,710 | Matthei | Feb. 26, 1935 |
| 2,027,898 | Broulhiet | Jan. 14, 1936 |
| 2,033,813 | Broulhiet | Mar. 10, 1936 |
| 2,118,448 | Wallace et al. | May 24, 1938 |
| 2,165,074 | Sherman | July 4, 1939 |
| 2,188,326 | Windsor et al. | Jan. 30, 1940 |
| 2,297,123 | Almdale | Sept. 29, 1942 |

FOREIGN PATENTS

| | | |
|---|---|---|
| 533,402 | Great Britain | Nov. 3, 1939 |